US009608264B2

(12) United States Patent
Kisdarjono et al.

(10) Patent No.: US 9,608,264 B2
(45) Date of Patent: Mar. 28, 2017

(54) AIR CATHODE BATTERY USING ZINC SLURRY ANODE WITH CARBON ADDITIVE

(71) Applicant: Sharp Laboratories of America (SLA), Inc., Camas, WA (US)

(72) Inventors: Hidayat Kisdarjono, Vancouver, WA (US); Yuhao Lu, Vancouver, WA (US); Jong-Jan Lee, Camas, WA (US); David Evans, Beaverton, OR (US); Long Wang, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 280 days.

(21) Appl. No.: 14/473,713

(22) Filed: Aug. 29, 2014

(65) Prior Publication Data

US 2014/0370401 A1 Dec. 18, 2014

Related U.S. Application Data

(63) Continuation-in-part of application No. 14/042,264, filed on Sep. 30, 2013, which is a continuation-in-part of application No. 13/564,015, filed on Aug. 1, 2012.

(51) Int. Cl.
*H01M 4/38* (2006.01)
*H01M 12/08* (2006.01)
(Continued)

(52) U.S. Cl.
CPC ............. *H01M 4/38* (2013.01); *H01M 4/364* (2013.01); *H01M 4/62* (2013.01); *H01M 4/625* (2013.01);
(Continued)

(58) Field of Classification Search
None
See application file for complete search history.

(56) References Cited

U.S. PATENT DOCUMENTS

2005/0238949 A1* 10/2005 Morris ............... H01M 2/40
429/113
2012/0021303 A1 1/2012 Amendola et al.
(Continued)

FOREIGN PATENT DOCUMENTS

WO WO 2011073975 A2 * 6/2011 ............ H02J 7/0052

OTHER PUBLICATIONS

F. R. McLarnon, "The Secondary Alkaline Zinc Electrode," Journal of the Electrochemical Society, vol. 138, No. 2, p. 645, 1991.
(Continued)

*Primary Examiner* — Patrick Ryan
*Assistant Examiner* — Haixia Zhang
(74) *Attorney, Agent, or Firm* — Law Office of Gerald Maliszewski; Gerald Maliszewski (57) ABSTRACT

An air cathode battery is provided that uses a zinc slurry anode with carbon additives. The battery is made from an air cathode and a zinc slurry anode. The zinc slurry anode includes zinc particles, an alkaline electrolyte, with a complexing agent and carbon additives in the alkaline electrolyte. A water permeable ion-exchange membrane and electrolyte chamber separate the zinc slurry from the air cathode. The carbon additives may, for example, be graphite, carbon fiber, carbon black, or carbon nanoparticles. The proportion of carbon additives to zinc is in the range of 2.5 to 10% by weight. The proportion of alkaline electrolyte in the zinc slurry is in the range of 50 to 80% by volume.

9 Claims, 5 Drawing Sheets

(51) Int. Cl.
*H01M 4/36* (2006.01)
*H01M 4/62* (2006.01)
*H01M 4/76* (2006.01)
*H01M 6/50* (2006.01)
*H01M 12/06* (2006.01)
*H01M 8/04276* (2016.01)
*H01M 8/083* (2016.01)

(52) U.S. Cl.
CPC ........... *H01M 4/76* (2013.01); *H01M 6/5077* (2013.01); *H01M 8/04276* (2013.01); *H01M 12/06* (2013.01); *H01M 12/08* (2013.01); *H01M 8/083* (2013.01)

(56) References Cited

U.S. PATENT DOCUMENTS

2013/0113431 A1    5/2013  Banerjee et al.
2013/0285597 A1*  10/2013  Goldstein ............ H02J 7/0052
                                                        320/107

OTHER PUBLICATIONS

C. Cachet, "The Behavior of Zinc Electrode in Alkaline Electrolytes," Journal of the Electrochemical Society, vol. 139, No. 3, p. 644, 1992.

G. Bronoel, A. Millot, and N. Tassin, "Development of Ni琊 Zn cells," Journal of Power Sources, vol. 34, No. 3, pp. 243-255, Apr. 1991.

* cited by examiner

AIR CATHODE BATTERY USING ZINC SLURRY ANODE WITH CARBON ADDITIVE

RELATED APPLICATION

The application is a Continuation-in-Part of a pending application entitled, FLOW-THROUGH METAL BATTERY WITH ION EXCHANGE MEMBRANE, invented by Yuhao Lu et al., Ser. No. 14/042,264, filed on Sep. 30, 2013;

which is a Continuation-in-Part of a pending application entitled, BATTERY WITH LOW TEMPERATURE MOLTEN SALT (LTMS) CATHODE, invented by Yuhao Lu et al., Ser. No. 13/564,015, filed on Aug. 1, 2012. Both these applications are incorporated herein by reference.

BACKGROUND OF THE INVENTION

1. Field of the Invention

This invention generally relates to electrochemical cells and, more particularly, to a flow-through air cathode battery using a zinc slurry anode with a carbon additive, complexing agent, and auxiliary water source.

2. Description of the Related Art

Flow-through batteries has been intensively studied and developed for large-scale energy storage due to their long cycle life, flexible design, and high reliability. A battery is an electrochemical device in which ions (e.g. metal-ions, hydroxyl-ions, protons, etc.) commute between the anode and cathode to realize energy storage and conversion. In a conventional battery, all the components including anode materials, cathode materials, separator, electrolyte, and current collectors are packed into a volume-fixed container. Its energy and capacity of are unchangeable as long as the battery is assembled. A flow-through battery consists of current collectors (electrodes) separated by an ion exchange membrane, while its anode and cathode materials are stored in separate storage tanks. The anode and cathode materials are circulated through the flow-through battery in which electrochemical reactions take place to deliver and to store energy. Therefore, the battery capacity and energy are determined by (1) electrode materials (anolyte and catholyte), (2) the concentrations of anolyte and catholyte, and (3) the volumes of anolyte and catholyte storage tanks.

An air battery may be considered to be a flow-through cathode battery where oxygen in the air is continuously passed over a reactive metal electrode to act as a cathode. An electrolyte typically separates the cathode from a metal or a metal compound anode. Zinc is a favored material, and it may be in a solid phase or in a particle form to enable a flow-through anode. Conventional batteries using a flow-through zinc particle anode suffer from the large amounts of electrolyte required to avoid passivation around zinc particles. Further, the zinc particle anode requires continuous pumping, and the viscosity needed to support pumping results in a low zinc concentration.

It would be advantageous if a flow-through zinc anode battery existed that used a low viscosity slurry with a high concentration of zinc.

SUMMARY OF THE INVENTION

Disclosed herein is a zinc-air battery with a scalable capacity enabled by coupling an air cathode with a low cost, zinc slurry anode. The slurry anode allows for a mechanical recharge of the zinc air battery. The zinc-air battery uses an anode in the form of highly concentrated zinc slurry with a sufficiently low viscosity that does not solidify after discharge. After being discharged, spent slurry can be replaced by fresh slurry pumped from a connected reservoir, so that mechanical charging is realized. The slurry anode includes zinc particles, alkaline solution, complexing agent, and carbon additives. Some unique aspects of the battery include the use of additives (e.g. graphite or carbon fiber) and complexing agents to improve viscosity, a mechanism to move slurry through the system to replace spent slurry with fresh slurry (mechanical charge), and a mechanism to maintain adequate water content in the slurry, so as to prevent the slurry from drying out, so the chemical reaction can proceed to completion. In this type of zinc-air battery, the zinc slurry is capable of a deep discharge (80% or greater) and high energy density. Since the slurry does not require continuous pumping, the battery efficiency is improved.

Accordingly, an air cathode battery is provided that uses a zinc slurry anode with carbon additives. The battery is made from an air cathode and a zinc slurry anode. The zinc slurry anode includes zinc particles, an alkaline electrolyte, with a complexing agent and carbon additives in the alkaline electrolyte. An electrolyte chamber, with an alkaline electrolyte, adjoins the air cathode, and a water permeable ion-exchange membrane separates the electrolyte chamber from the zinc slurry. The carbon additives may, for example, be graphite, carbon fiber, carbon black, or carbon nanoparticles. The proportion of carbon additives to zinc is in the range of 2.5 to 10% by weight. The proportion of alkaline electrolyte in the zinc slurry is in the range of 50 to 80% by volume.

When the battery is in the charged state (i.e. the zinc slurry is fresh), the zinc slurry has an electrical resistance of less than 10 ohms and a zinc molar concentration of greater than 15 moles per liter. The zinc slurry has a viscosity in the range of 10,000 to 1,000,000 centipoise (cP), at 25 degrees C., in the battery charged state.

Additional details of the above-described zinc-air battery are provided below.

DETAILED DESCRIPTION

Figure 1A:
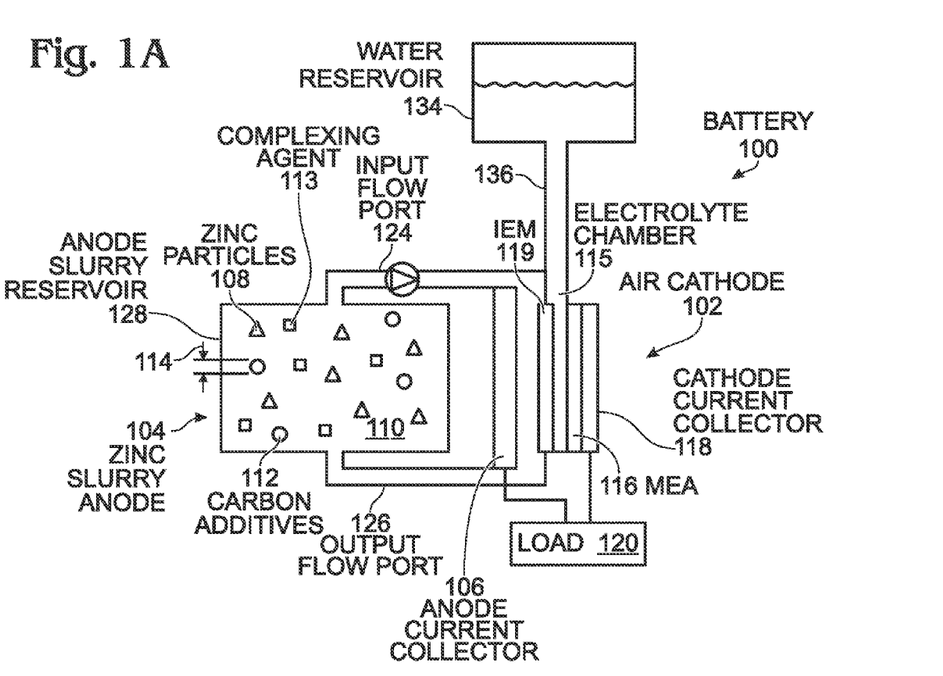
FIGS. 1A and 1B are, respectively, a partial cross-sectional view of an air cathode battery using a zinc slurry anode with carbon additives, and a detailed view.
Figure 1B:
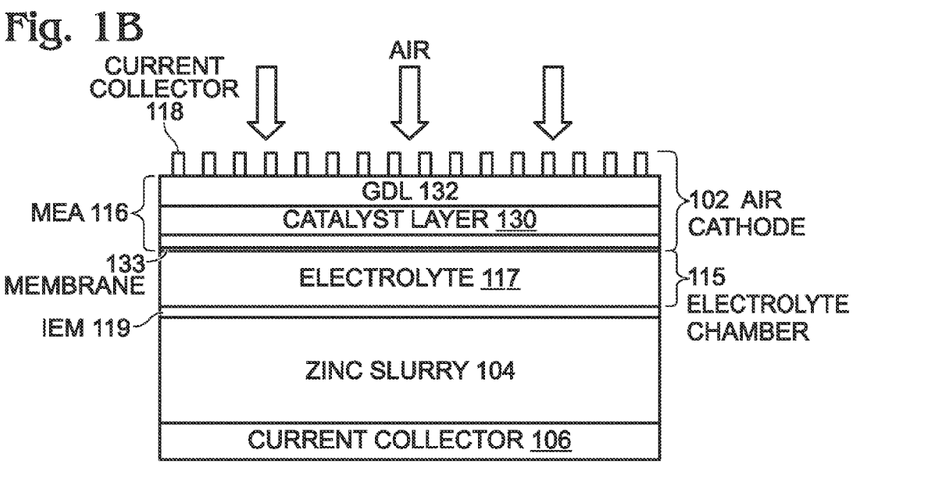

FIGS. 1A and 1B are, respectively, a partial cross-sectional view of an air cathode battery using a zinc slurry anode with carbon additives, and a detailed view. The battery 100 comprises an air cathode 102 and a zinc slurry anode 104. The zinc slurry anode 104 comprises a current collector 106, zinc particles 108, an alkaline electrolyte 110, with carbon additives 112 and a complexing agent 113 in the alkaline electrolyte 110. Together, the zinc particles 108, alkaline electrolyte 110, complexing agent 113, and carbon additives 112 form a zinc slurry. Typically, the zinc particles 108 have an average size (diameter) 114 in the range of 1 micron to 500 microns. Note: the drawing is not to scale. Alternatively, instead or in addition to Zn, the particles may be magnesium (Mg), aluminum (Al), iron (Fe), copper (Cu), or combinations of these metal particles. An electrolyte chamber 115 comprising alkaline electrolyte 117 is adjacent the air cathode 102, and a water permeable ion-exchange membrane 119 is interposed between the electrolyte chamber and the zinc slurry 104.

The carbon additives 112 may be graphite, carbon fiber, carbon black, or carbon nanoparticles. However, other forms of carbon may also be suitable. The alkaline electrolytes 110 and 117 may, for example, be potassium hydroxide (KOH) or sodium hydroxide (NaOH). However, many other alkaline electrolytes are known that could also be suitable. In some aspects, the electrolyte may include additional (excess) water that permeates across the IEM 119 to prevent the zinc slurry 104 from drying. The complexing agent 113 may be ethylene diamine tetra acetic acid (EDTA), citric acid, or ammonium hydroxide. However, this is not an exhaustive list and other complexing agents would be known by those with skill in the art.

In a charged state, the zinc slurry (i.e. fresh zinc slurry) has an electrical resistance of less than 10 ohms and a zinc molar concentration of greater than 15 moles per liter (mol/L). As used herein, a "charged state" is defined as a battery active material not having undergone spontaneous redox reactions that drive electrons (through an external circuit, e.g. load) from the anode to the cathode—thus generating power. A "discharged state" is defined herein as the condition where the spontaneous reaction that generated power has ceased because the anode materials have been oxidized and the cathode materials have been reduced. Fresh Zn or fresh Zn slurry refers to the zinc with a neutral charge or in metallic form. Spent Zn or spent Zn slurry refers to zinc that has been oxidized and converted to ZnO. The Zn in ZnO is an ion with a 2+ charge, having lost 2 electrons to the O atom. The spent slurry has larger volume because ZnO is less dense than Zn.

The proportion of carbon additives 112 to zinc 108 is in a range of 2.5 to 10% by weight (wt %). The proportion of alkaline electrolyte 110 in the zinc slurry is in the range of 50 to 80% by volume. The zinc slurry has a viscosity in the range of 10,000 to 1,000,000 centipoise (cP), at 25 degrees C., in the battery charged state.

The air cathode 102 comprises a membrane electrode assembly (MEA) 116 and a current collector 118. As shown in FIG. 1B, MEA 116 may comprise catalyst layer 130 and gas diffusion layer (GDL) 132. A membrane 133 separates the catalyst later 130 from electrolyte 117. The catalyst agent may be platinum particles, embedded in electrically conducting layer of carbon. The GDL may comprise a layer of carbon and platinum particles with some hydrophobic agent such as Teflon. The GDL 132 allows air in from outside, but keeps water and electrolyte from seeping out, to prevent drying.

Typically, current collectors 118 and 106 are a highly conductive metal or metal-coated carbon material. Current collectors 106 and 118 are shown electrically connected to a load 120. As is well known in the art, MEAs are widely used in fuel cells, which share a number of characteristics with flow-through batteries.

An anode compartment houses anode current collector 106, with an input flow port 124, and an output flow port 126. An anode slurry reservoir 128 is connected to the input flow port 124 and output flow port 126 of the anode compartment. In one aspect, the battery 100 comprises a water reservoir 134, and the electrolyte chamber 115 has an input port 136 connected to the water reservoir.

The use of slurry in a zinc-air system allows for the battery capacity to be maximized, as the zinc concentration in slurry of the disclosed battery is much higher than in conventional mechanically rechargeable batteries. For example, a slurry with 30 moles per liter of zinc has been demonstrated.

Another unique aspect is the use of carbon additives (e.g. graphite or carbon fiber) and a complexing agent in the slurry. Without a complexing agent, the highly concentrated slurry would become hardened after it is discharged and would be exceedingly difficult to remove from the cell. The hardening or cementation of slurry occurs because when Zn is converted into ZnO, and two things can occur. First, the effective surface area of slurry particles increases because zinc particles become smaller and the zinc oxide that forms is porous. This results in strong adhesion between particles. Second, water is trapped in the porous zinc oxide and becomes unavailable to serve as medium through which ions can move, thereby stopping the chemical reaction. Complexing agents are molecules that interact with, typically, a metal ion to form a metal complex where the metal is surrounded by the molecules. Typically, the result is the sequestration of the metal ions, which then prevents them from aggregating with other metal ions. The formation of metal complexes is also a means for passivating these metal ions which otherwise would react with other compounds in their vicinity. That is, the complexing agent is used to prevent Zn2+ from precipitating into ZnO.

With regard to the carbon materials, it was observed that the amount of electrolyte (liquid) that could be added in the slurry mixture was highly dependent on the amount of carbon. Without carbon, the volume of electrolyte could not exceed the volume held by capillary force in the space between zinc particles. This amount approximates that which is used in commercial zinc-air battery, resulting in slurry that behaves like wet sand and is very difficult to pump. Adding more liquid beyond this amount results in a visibly separated mixture with zinc particles settling out to the bottom. Such a mixture is mechanically unstable, i.e. at high pressure, the excess liquid moves at a different velocity than the heavier zinc particles. With addition of a small amount of carbon materials however, a significantly larger amount of electrolyte can be added as it is adsorbed by the high surface-area carbon. The resultant slurry is a less viscous, smoother, and a more stable suspension. Furthermore, carbon additives also prevent solidification, which typically occurs to a zinc-only slurry after deep discharge. During discharge, particles of zinc are converted to zinc oxide through the Zn/ZnO redox reaction as follows:

$$Zn \leftrightarrow 2e^- + ZnO^{2+} \quad (-1.23 \text{ V})$$

The volume of the zinc oxide is up to 20% greater than the zinc particles prior to discharge. Such an expansion causes a zinc-only slurry to solidify upon discharge, making it very difficult to pump slurry through the system. As observed in practice, when fresh conventional zinc slurry is discharged (to 76% capacity), the conversion to ZnO caused the slurry to expand its volume and solidify.

Figure 2A:
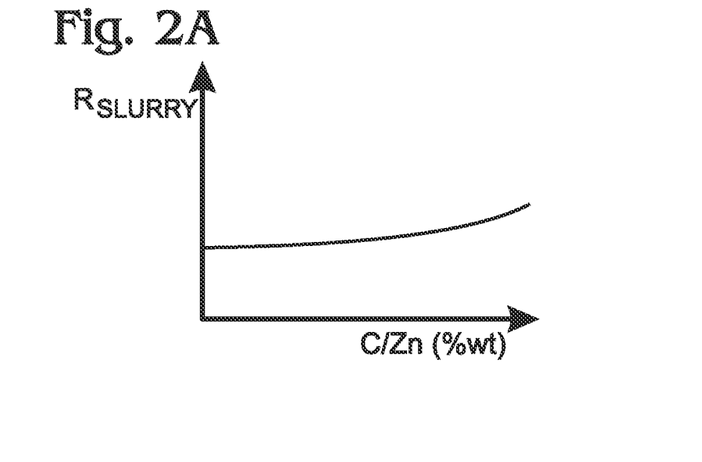
FIGS. 2A through 2C depict the relationship between slurry parameters.
Figure 2B:
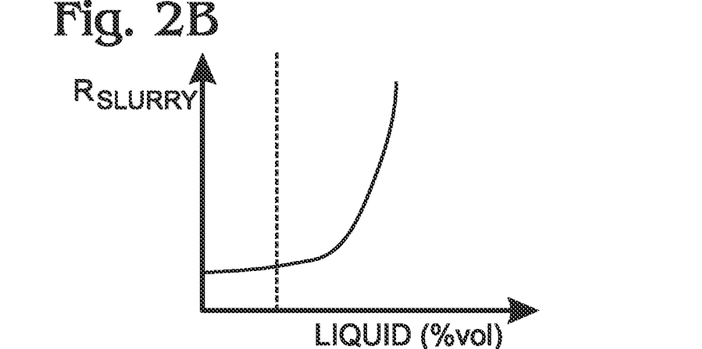
Figure 2C:
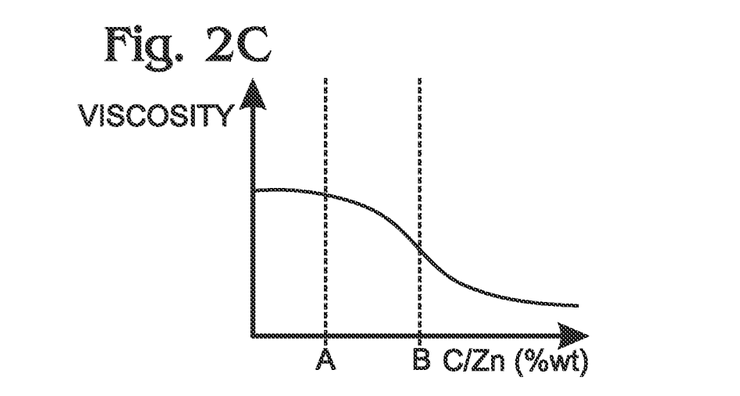

FIGS. 2A through 2C depict the relationship between slurry parameters. Clearly it would be desirable to reduce the amount of carbon and electrolyte as much as possible, while still maintaining a stable suspension with a viscosity range that permits the slurry to be pumped through the system. The basis for slurry optimization is the relationships between slurry composition and its mechanical/electrical parameters. For example, the DC resistance of slurry ($R_{slurry}$) is dependent on the carbon to zinc ratio (FIG. 2A), as well as the percentage of liquid electrolyte to the overall volume of the slurry (FIG. 2B). The dashed line in FIG. 2B indicates the maximum amount of liquid that can be added before settling of the zinc particles occurs, thus providing one constraint. Slurry viscosity is also dependent on carbon to zinc ratio as shown in FIG. 2C. The dashed lines A and B determine viscosity range in which both the pumping of slurry is possible and amount of carbon is not so excessive as to create a high DC resistance. There is also the size of the zinc particle to consider. When the zinc particles are too small, self-discharge may be significant. When the zinc particles are too large, utilization decreases, settling occurs, and friction with channel walls increases. Self-discharge is the low-rate, parasitic, spontaneous oxidation of zinc by OH— due to the splitting of water in the electrolyte occurring as a result of the following reaction:

$$2H_2O+2e^-\rightarrow H_2+2OH-.$$

For example, experiments correlating composition to slurry resistance demonstrate that a zinc concentration as high as 36 moles per liter (Mol/L) is possible. Such a slurry demonstrated a Coulombic efficiency as high as 95%, utilization of 63% with a capacity retention of 95% over 10 cycles, at current density of 30 milliamperes per square centimeter (mA/cm$^2$).

| Sample | C/Zn (% wt) | Zn concentration (mol/L) | KOH (% vol) | Calculated slurry resistance (Ω) |
|---|---|---|---|---|
| A | 10.7 | 22 | 67 | 19.9 |
| B | 5.3 | 29 | 65 | 90.3 |
| C | 4.5 | 34 | 59 | 8.5 |
| D | 2.8 | 36 | 57 | 9.8 |

Figure 3A:
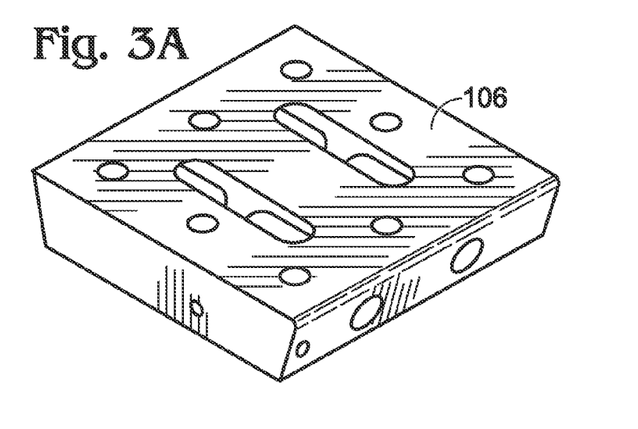
FIG. 3A through 3C depict variations of exemplary anode current collector/flow channels.
Figure 3B:
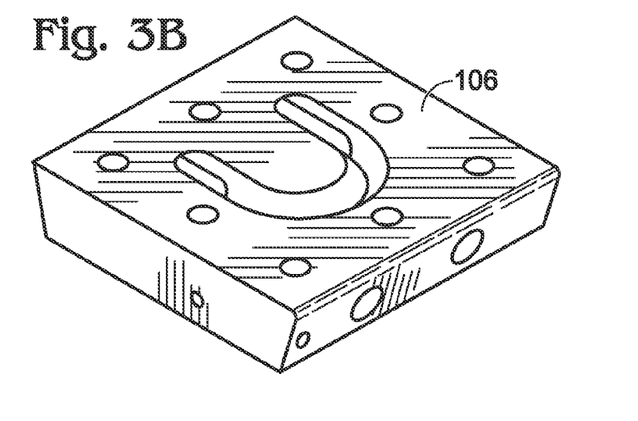
Figure 3C:
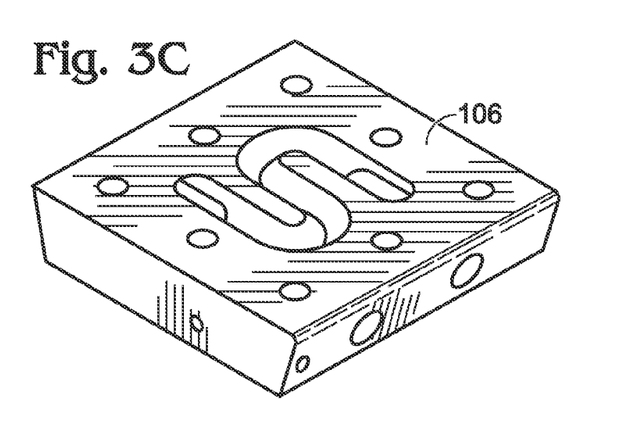

FIG. 3A through 3C depict variations of exemplary anode current collector/flow channels. FIG. 3A depicts a dual channel anode current collector 106 capable of 3.3 milliliters (mL)/8 cm$^2$/3700 mA hours (mAh). FIG. 3B depicts a U-channel anode current collector 106 capable of 3.6 mL/8.7 cm$^2$/4100 mAh, and FIG. 3C depicts a serpentine-channel anode current collector 106 capable of 4.6 mL/11.2 cm$^2$/3200 mAh. For example, the current collectors may be made of a graphite material coated with a metal such as tin. The volume of the slurry (mL) is directly related to the measure of electron flow (mAh). The active area (cm$^2$) between the anode and cathode also effects how much current (electron flow) is generated.

Figure 4:
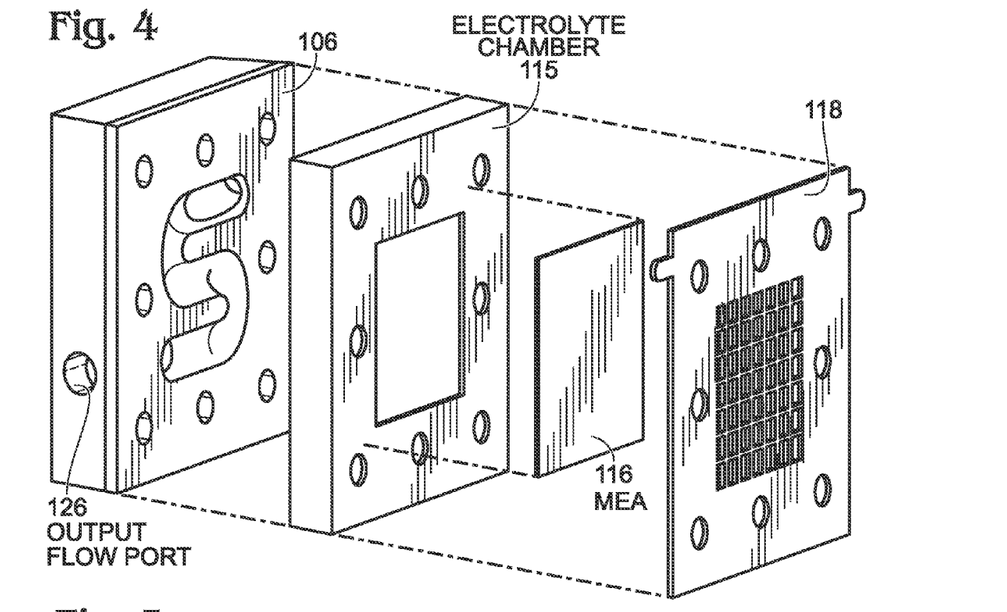
FIG. 4 depicts an exemplary anode compartment and cathode interface.

FIG. 4 depicts an exemplary anode compartment and cathode interface. The example uses the serpentine-channel anode current collector 106 of FIG. 3C. Also shown is MEA 116 which may comprise the unseen components of platinum catalysts fixed onto carbon cloth or carbon paper, which has been pressed onto ion-exchange membrane or separator substrate. The carbon cloth/paper of the MEA 116 interfaces with the cathode current collector 118. The electrolyte chamber 115 interfaces with the MEA 116 on one surface, and a water permeable IEM (not shown) on the back-side surface interfaces with the zinc slurry. The current collector 118 may be a mesh, so that most of area of MEA 116 interfaces with air. Carbon paper is electrically conducting so electrons can pass from MEA/air interface where redox reactions occur.

Figure 5:
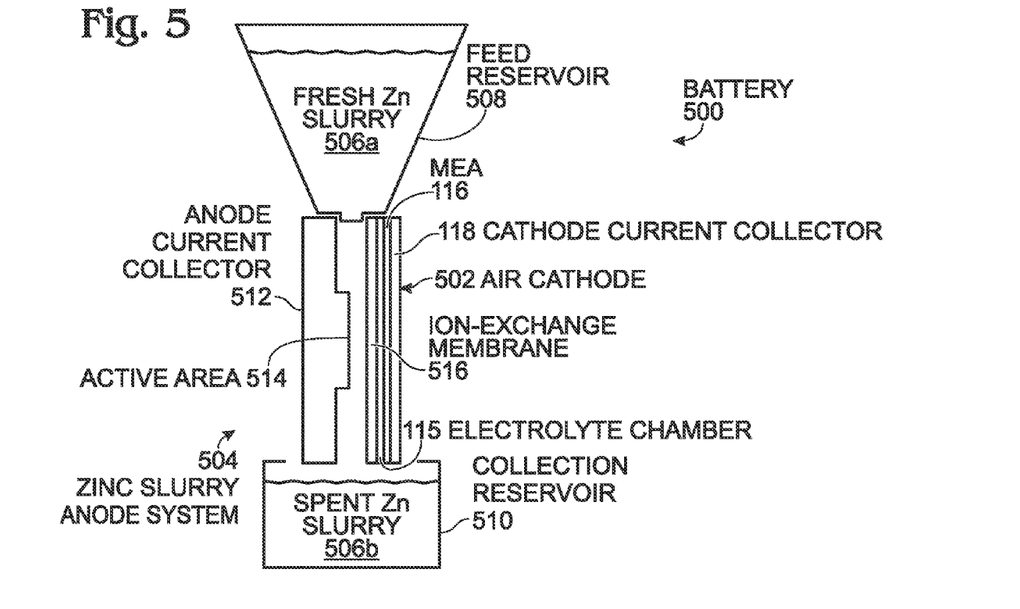
FIG. 5 is a partial cross-sectional view depicting a gravity-feed air cathode battery using a rechargeable zinc slurry anode.

FIG. 5 is a partial cross-sectional view depicting a gravity-feed air cathode battery using a rechargeable zinc slurry anode. The battery 500 comprises an air cathode 502 and a zinc slurry anode system 504. The zinc slurry anode system 504 includes a zinc slurry 506 comprising zinc particles, an alkaline electrolyte, with a complexing agent and carbon additives in the alkaline electrolyte (not shown). The electrolyte chamber 115 is adjacent the air cathode 502, and water permeable IEM 516 separates the zinc slurry 506a from the alkaline electrolyte in the electrolyte chamber. Typically, the zinc particles have an average size in a range of 1 micron to 500 microns. Large particles tend to increase viscosity, while smaller particles are more mechanically stable (less likely to settle out of the slurry), but less chemically stable (more likely to suffer from self-discharge). The fresh zinc slurry 506a has an electrical resistance of less than 10 ohms and a zinc molar concentration of greater than 15 moles per liter.

The zinc slurry anode system 504 also comprises a slurry feed reservoir 508, a slurry collection reservoir 510, and an anode current collector 512 with a rechargeable active area 514 adjacent to the air cathode 502. The active area 514 accepts a fresh zinc slurry 506a in a charged state from the slurry feed reservoir 508 and provides spent zinc slurry 506b in a discharged state to the slurry collection reservoir 510. The air cathode 502 comprises a membrane electrode assembly (MEA) 116 and a current collector 118.

As noted above, another key feature of the battery is the means of maintain adequate water content in the slurry, to prevent drying-out, so chemical reactions can proceed to completion. Water, in its role as solvent in an electrolyte, dissolves the salts, bases, or acids that provide the ions required in chemical reactions. Also, water is the medium through which these ions are shuttling. Without adequate water, chemical reaction cease and battery stops functioning even before the active material have is exhausted. In other words, the battery would have low utilization. The volume of electrolyte intervening between slurry and air-cathode can automatically supply water when it is consumed in the slurry via the semi-permeable membrane between electrolyte and slurry. Without this ability to replenish water into the slurry, the slurry dries, as previously explained.

Figure 6A:
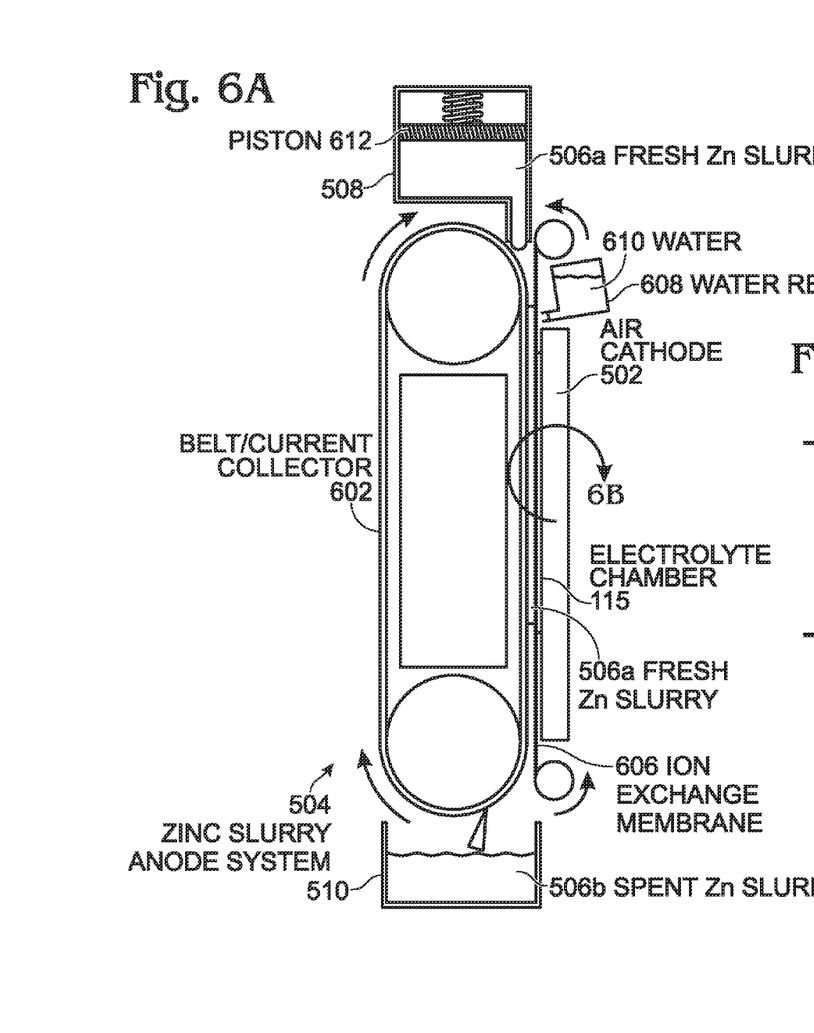
FIG. 6A is a cross-sectional view depicting a variation of the air cathode battery of FIG. 5.
Figure 6B:
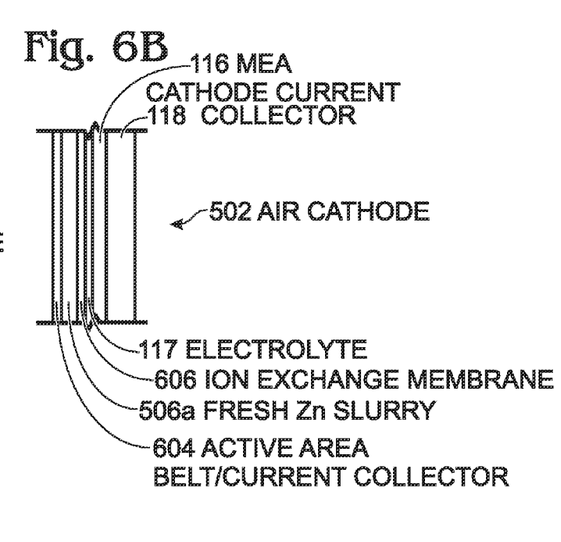
FIG. 6B depicts a detail of FIG. 6A.

FIG. 6A is a cross-sectional view depicting a variation of the air cathode battery of FIG. 5. FIG. 6B depicts a detail of FIG. 6A. In one aspect, a battery 600 comprises an anode current collector enabled as a conveyor belt 602 accepting fresh zinc slurry 506a from the slurry feed reservoir 508. The conveyor belt 602 may be made, for example, from a metal foil such as nickel. The conveyor belt current collector 602 presents the fresh zinc slurry 506a to the air cathode 502 as the rechargeable active area 604, and deposits spent zinc slurry 506b from active area 604 into the slurry collection reservoir 510. The slurry feed reservoir 508 gravity feeds fresh zinc slurry 506a to the anode current collector conveyor belt 602, and the anode current collector conveyor belt gravity feeds spent zinc slurry 506b to the slurry collection reservoir 510.

In one aspect as shown, the water permeable ion-exchange membrane 606 is a conveyor belt synchronously moving adjacent to the anode current collector conveyor belt 602. The spacing between the ion-exchange membrane 606 and the conveyor belt current collector 602 affects internal resistance and the rate of discharge. There is a small angle between conveyor belt current collector 602 which is determined by the flow characteristic of the zinc slurry 506a and the volume expansion of the spent slurry 506b as it is discharged. For example, the gap between the conveyor belt 602 and ion-exchange membrane may be narrower near that fresh slurry reservoir 508 than it is near the spent slurry reservoir 510, to define an off-vertical angle. The gap or angle may be adjustable to prevent excess densification of the slurry and to facilitate its removal from the conveyor belt 602. The battery 600 may be continuously operated as long as it is mechanically charged (fresh zinc slurry is supplied).

An optional auxiliary water reservoir 608 may be used to gravity feed water 610 into the electrolyte chamber 115 between the ion exchange membrane conveyor belt 606 and the air cathode 502. The challenge is to move the zinc slurry, with solids that are quite abrasive, while creating an intimate contact between slurry/IEM/air cathode, for the promotion of a low internal resistance and continuous ionic path.

As another option, a piston 612 may be used, in addition to gravity to encourage and control the flow of fresh zinc slurry 506a. In other aspects not shown, where the battery is horizontally instead of vertically mounted, the piston may be the only force used to flow the fresh zinc slurry.

In common with the battery of FIG. 1, the carbon additives in the zinc slurry 506 of the batteries described in FIGS. 5, 6A, and 6B may be graphite, carbon fiber, carbon black, or carbon nanoparticles. The proportion of carbon additives to zinc is in a range of 2.5 to 10% by weight, and the proportion of alkaline electrolyte in the zinc slurry is in a range of 50 to 80% by volume.

The alkaline electrolyte in the fresh zinc slurry 506a (or spent zinc slurry 506b) may be potassium hydroxide (KOH) or sodium hydroxide (NaOH). The auxiliary electrolyte 117 may be the same or a different electrolyte material than is used in the zinc slurry.

A flow-through battery has been provided along with an associated method for creating a voltage potential. Examples of materials and slurry flow configurations have been presented to illustrate the invention. However, the invention is not limited to merely these examples. Other variations and embodiments of the invention will occur to those skilled in the art.

We claim:

1. An air cathode battery using a zinc slurry anode with carbon additives, the battery comprising:
   an air cathode;
   the zinc slurry anode comprising:
      a current collector;
      zinc particles;
      an alkaline electrolyte;
      the carbon additives and a complexing agent in the alkaline electrolyte;
   an electrolyte chamber, comprising the alkaline electrolyte, adjacent the air cathode;
   a water permeable ion-exchange membrane (IEM) separating the zinc slurry anode from the electrolyte chamber;
   wherein the zinc slurry, in a battery charged state, has an electrical resistance of less than 10 ohms and a zinc molar concentration of greater than 15 moles per liter;
   wherein the proportion of carbon additives to zinc is in a range of 2.5 to 10% by weight; and
   wherein the proportion of alkaline electrolyte in the zinc slurry is in a range of 50 to 80% by volume.

2. The battery of claim 1 wherein the carbon additives are selected from a group consisting of graphite, carbon fiber, carbon black, and carbon nanoparticles.

3. The battery of claim 1 wherein the zinc particles have an average size in a range of 1 micron to 500 microns.

4. The battery of claim 1 wherein the alkaline electrolyte is selected from a group consisting of potassium hydroxide MOM and sodium hydroxide (NaOH).

5. The battery of claim 1 wherein the air cathode comprises:
   a membrane electrode assembly (MEA); and
   a current collector.

6. The battery of claim 1 further comprising:
   an anode compartment with the current collector, an input flow port, and an output flow port; and
   an anode slurry reservoir connected to the input and output flow ports of the anode compartment.

7. The battery of claim 1 wherein the zinc slurry has a viscosity in a range of 10,000 to 1,000,000 centipoise (cP), at 25 degrees C., in a battery charged state.

8. The battery of claim 1 wherein the complexing agent is selected from a group consisting of ethylene diamine tetra acetic acid (EDTA), citric acid, and ammonium hydroxide.

9. The battery of claim 1 further comprising:
   a water reservoir; and
   wherein the electrolyte chamber has an input port connected to the water reservoir.

* * * * *